United States Patent [19]

Meijer et al.

[11] Patent Number: 4,785,633
[45] Date of Patent: Nov. 22, 1988

[54] SOLAR EVAPORATOR

[75] Inventors: Roelf J. Meijer; Benjamin Ziph, Ann Arbor, both of Mich.

[73] Assignee: Stirling Thermal Motors, Inc., Ann Arbor, Mich.

[21] Appl. No.: 166,322

[22] Filed: Mar. 10, 1988

[51] Int. Cl.$^4$ .............................. F02G 1/04; F03G 7/02
[52] U.S. Cl. ................................... 60/641.15; 60/517; 126/433; 126/438
[58] Field of Search ................... 60/517, 524, 641.15; 126/433, 434, 438

[56] References Cited

U.S. PATENT DOCUMENTS 4,135,367 1/1979 Frosch et al. .................. 126/433 X
4,473,065 9/1984 Bates ................................... 126/433

Primary Examiner—Allen M. Ostrager
Attorney, Agent, or Firm—Harness, Dickey & Pierce

[57] ABSTRACT

A solar evaporator for use with Stirling engines consisting of a dish shape hollow body having wicking containing a vaporizable liquid heating medium. The body has a pair of separate chambers to reduce the distance that capillary pressure is required to pump the heating medium and the chambers are thermally coupled by the wicking so that the temperatures in the chambers is at all times equalized.

6 Claims, 3 Drawing Sheets

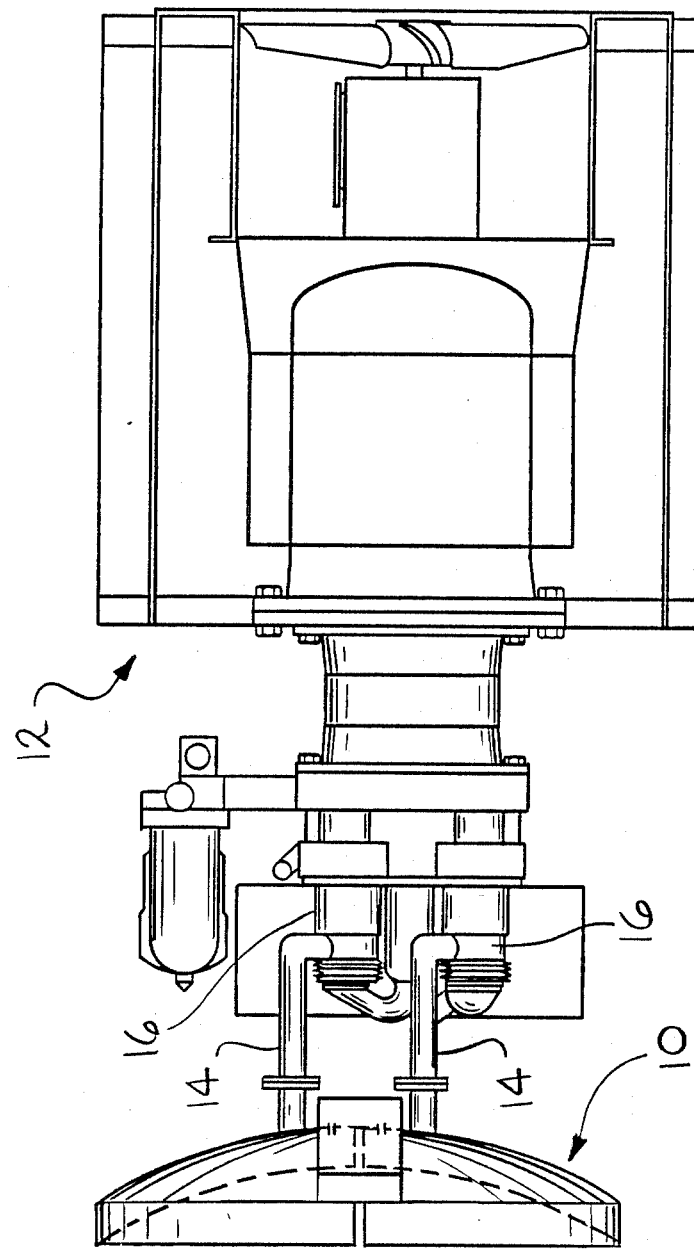

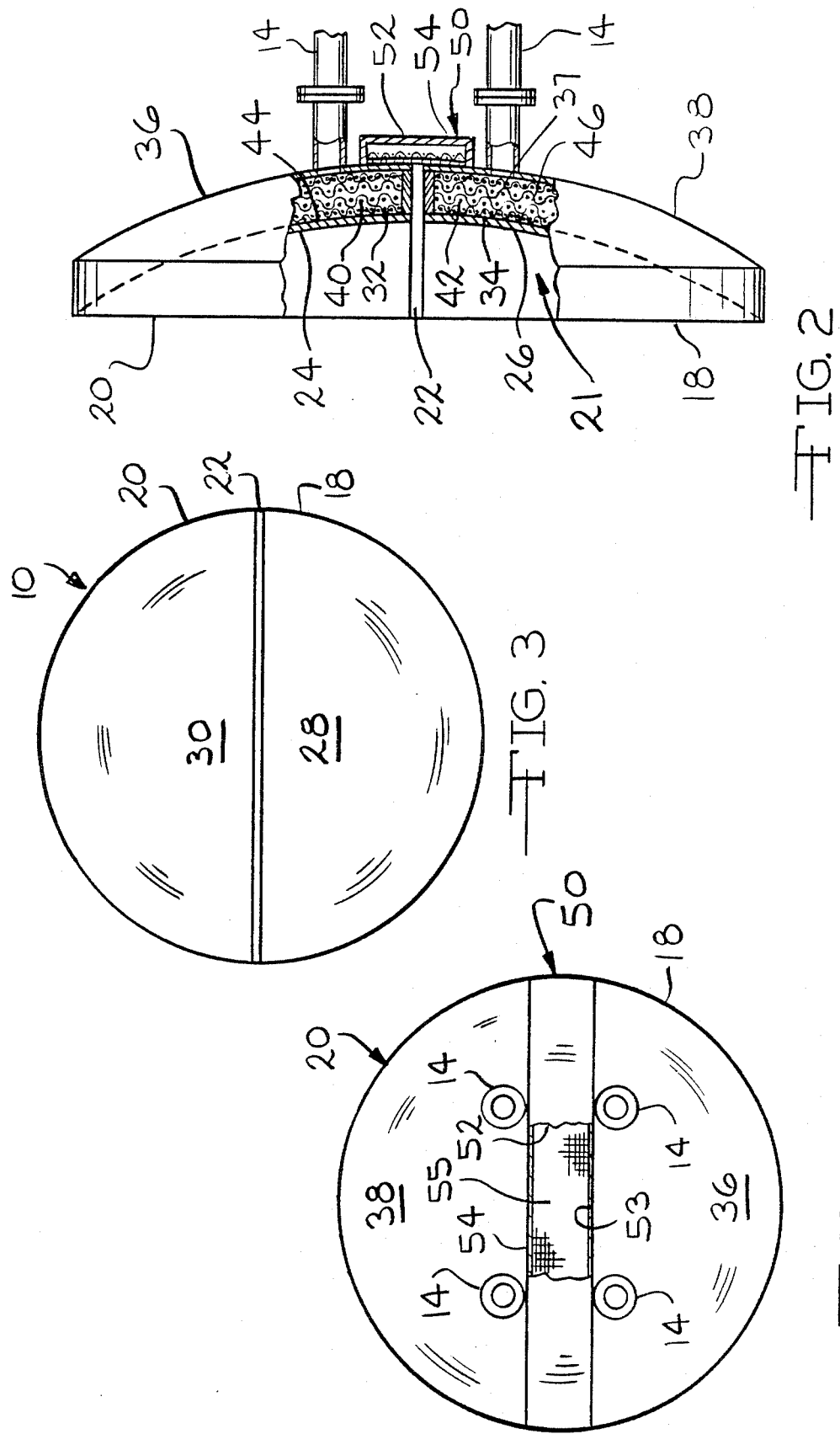

SOLAR EVAPORATOR

BACKGROUND AND SUMMARY OF THE INVENTION

The present invention relates to solar evaporators for thermal engines and, more particularly, to solar evaporators for Stirling engines in which temperatures in different parts of the evaporator tend to be equalized.

Evaporators for thermal or Stirling engines are utilized to heat a medium, ranging from cryogenic gases such as hydrogen to liquid metals such as sodium, and transport and medium from an evaporator to a condenser to provide energy to run the engine. Various types of evaporators and condensers exist in the art. One type, illustrated in U.S. Pat. No. 4,523,636, assigned to the assignee of the present invention, the specification of which is herein incorporated by reference, illustrates a heat fin configuration coupled with a heat pipe to transport the medium from the evaporator to the condenser.

The above art generally requires an external heat source such as heated air or the like to heat the fins to vaporize the medium and cause it to flow through the heat pipe. The present invention enables solar energy to heat the evaporator to in turn heat the medium and cause it to flow between the evaporator and the condenser. Devices which utilize solar energy to heat evaporators for thermal or Stirling engines are illustrated in U.S. patent application No. 019,651, filed Feb. 27, 1987, entitled "Solar Powered Stirling Engine", assigned to the assignee of the present invention, the specification of which is herein incorporated by reference. It is desirable to maximize the solar energy to heat the evaporator to transport the heated medium and to reduce problems resulting from unequal temperatures in spaced parts of the evaporator due to uneven distribution of solar heat on the receiving face of the evaporator.

Accordingly, the present invention provides a solar evaporator which enables the medium to be heated to substantially even temperatures and the flow transported equally from the evaporator through each pipe into each condenser chamber. Thus, the present invention provides a solar evaporator which maximizes the sun's energy.

The present invention provides a new and improved solar evaporator. The solar evaporator of the present invention is utilized with thermal engines which have at least two heat pipes and a corresponding number of condenser chambers communicating with each heat pipe. The evaporator includes a parabolic dish shape disk for receiving reflected rays of the sun and constructed so as to include a pair of side-by-side chambers in heat exchange relation with the face which receives the solar heat. The chambers communicate with the heat pipes. Wicks adapted to transport the heating medium fluid are disposed within the chambers in engagement with the walls to transport fluid between the chambers and the heat pipes.

In one embodiment of the invention, an auxiliary body extends between the evaporator chambers and includes a wick structure in heat exchange relation with the wicks in the chambers so that the temperatures in the chambers are equalized even though the heat flux distribution on the face of the disk is uneven. If one chamber is hotter it heats the medium in the wick in the auxiliary body. The medium in the body in turn heats the medium in the chamber which was cooler, and this exchange continues until the chamber temperatures are substantially equal.

In a second embodiment of the invention, the chambers are separated by a common wall and wicks are arranged on opposite sides. When one chamber is hotter than the other the medium in the wick in that chamber that is engaged with the common wall will heat the corresponding medium in the other chamber. This process of heating and cooling as the distribution of solar heat flux on the receiving face of the disk continues to change continually equalizes the temperature in the chambers.

From the subsequent description and the appended claims taken in conjunction with the accompanying drawings, additional advantages and features of the present invention will become apparent to those skilled in the art.

BRIEF DESCRIPTION OF THE DRAWINGS

FIG. 1 is an elevational view of a Stirling engine including a solar evaporator in accordance with the present invention;

FIG. 2 is an enlarged side elevation view partially in cross-section of the solar evaporator shown in FIG. 1;

FIG. 3 is a front view of the solar evaporator shown in FIG. 2;

FIG. 4 is a rear view, partly broken and shown partially in cross-section, of the solar evaporator shown in FIG. 2;

DETAILED DESCRIPTION OF THE PREFERRED EMBODIMENT

Figure 5:
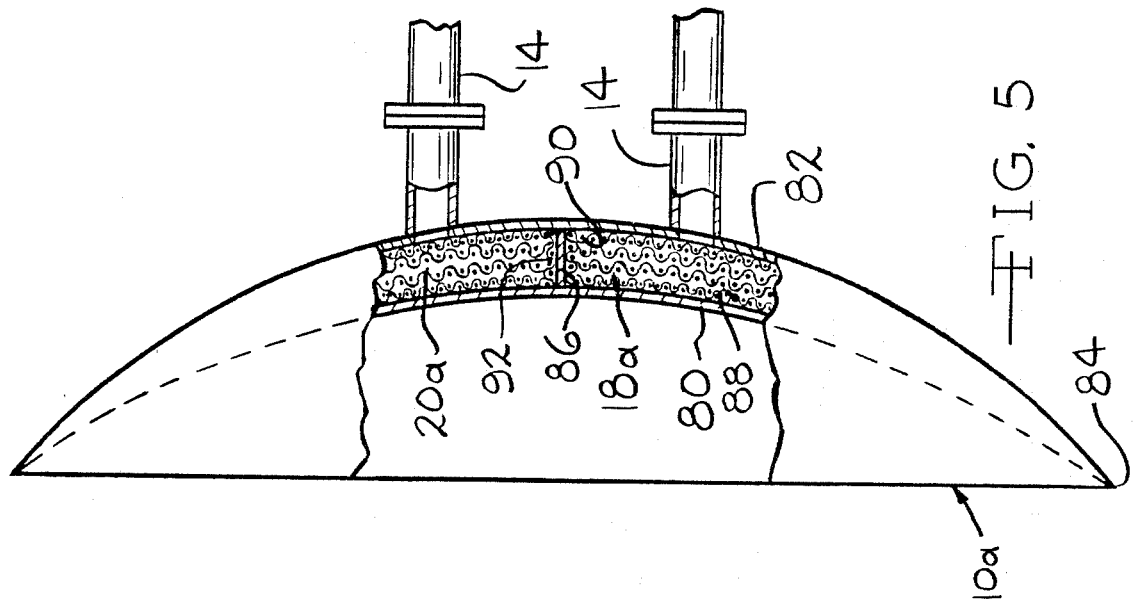
FIG. 5 is a side elevation view, like FIG. 2, of a modified form of the evaporator of this invention.

Referring to the drawings, particularly FIG. 1, the solar evaporator of this invention, indicated generally at 10, is illustrated in combination with a Stirling engine 12. The Stirling engine 12 includes heat pipes 14 communicating the evaporator 10 with the condenser chamber 16 of the engine 12.

Turning to FIGS. 2 through 4, it can be seen that the evaporator 10 includes first 18 and second 20 chambers positioned adjacent to one another forming the overall dish shape evaporator 10. The chambers 18 and 20 are formed by a parabolic disc shape body 21 having a concave front wall with upper and lower halves 24 and 26, respectively, separated by an air gap 22. The front walls 24 and 26 are of a concave configuration and have outer solar heat receiving faces 28 and 30 and the rear walls 36 and 38 are spaced rearwardly from the front walls. The interior surfaces 40 and 42 of the chambers 18 and 20 are lined with a wick 44 and coarse porous material 46 is engaged with the wick 44 to maintain it in heat exchange engagement with the body walls.

The wick 44, capable of transporting liquid with capillary action, is mounted on the internal surfaces of the evaporator 10 including the inner faces 32, 34, of the front walls 24, 25, and the inner faces 37, 39 of the rear walls 36 and 38 of the chambers 18 and 20.

Generally, the coarse porous material 46 is sandwiched between the front and back parts of the wick 44 to maintain the wick 44 against the inner faces 32, 34, 37 and 39 of the body 21. The coarse porous material 46 can be comprised of stainless stell gauze or other materials sufficiently porous to allow vaporous heat transport medium to flow therethrough with a minimum of obstruction to flow while providing compressive strength.

An auxiliary body 50 is coupled with the chambers 18 and 20 so as to bridge the air gap 22. The auxiliary body 50 includes a wall 52 which is coupled to the rear walls 36 and 38 of chambers 18 and 20. The auxiliary body 50 is hollow and includes a wick 54 which engages and is in heat exchange relation with the walls 36 and 38 along its entire length to enable transport of fluid heating medium from one end of the body 50 to the other along the length of the wick 54.

As the concave disk evaporator 10 is heated with solar energy, the liquid medium within the evaporator begins to "heat up". As the medium heats, heated vapor begins to travel from the chamber 18 and 20 into the heat pipes 14. However, the heat on the concave face of the evaporator will probably not be uniform so the temperature in the chamber 18 and 20 will not be equal.

Figure 6:
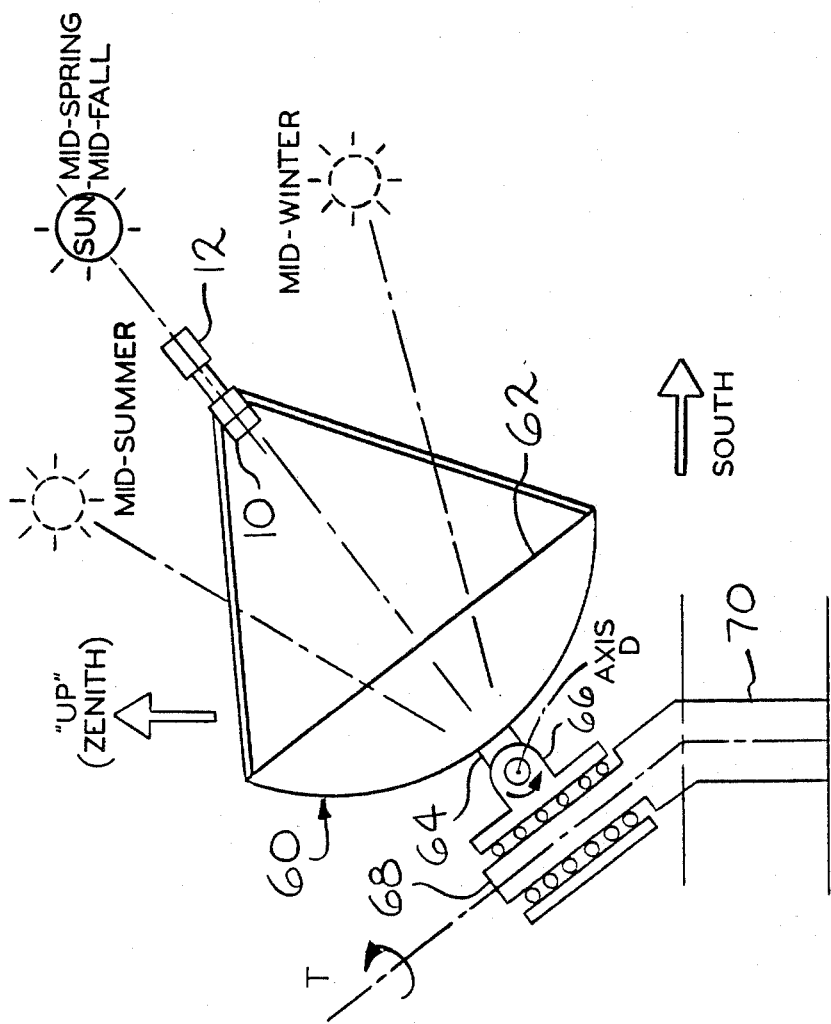
FIG. 6 an elevational view of a dish collector module and a Stirling engine equipped with the evaporator of this invention and mounted on the collector module so as to receive reflected solar energy from the collector, and illustrating the directional and seasonal orientation of the collector.

FIG. 6 shows a disk collector module 60 comprising a parabolic reflecting dish 62 which is supported for azimuthal and elevational motions. The disk 62 is illustrated supported on the outer end of an arm 64 that is pivotally supported at its inner end on a bracket 66 for up and down movement about an axis D. Arm 64 can be moved up and down angularly about the horizontal axis D. The bracket 66 is also rotatably supported on an upwardly inclined leg 68 of fixed support 70 so that the dish module 60 can be rotated about axis T.

Appropriate motive means are used to impart rotational motion to the disk 62 about axis T and to the arm 64 about axis D and there are suitable controls associated with the motive means for causing the dish to track the sun as it travels across the sky. Such motive means and controls are conventional and will not be explained in further detail here. Suffice it to say that the controls operate to keep the dish axis pointed at the sun, parallel with the direction of incident sunlight.

The dish 62 serves to concentrate the solar rays which are incident upon it by reflecting them to the focal point at which the dish shape body 21 in the evaporator 10 is located. The evaporator 10 is connected to the Stirling engine 12 by heat pipes 14 as shown in FIG. 1 and the combination is supported by suitable structural framework 72 on the collector module 60. It can thus be seen from FIG. 6 that inequality of heat on the chambers 18 and 20 is due to the movement of the sun and is to be expected.

Assume that one chamber 18 or 20 is hotter than the other chamber 18 or 20. The wick portion of 54 in heat exchange relation with the hot chamber will become hotter than the wick 54 opposite the cooler chamber. This will cause a flow of heated medium in the wick 54 to a position opposite the cooler chamber where it will give up heat to the cooler chamber until the temperatures of the chambers are equalized.

Thus, as the vaporous heated fluid medium flows into the four heat pipes 14, the flow rate in each heat pipe will be substantially equal to the flow rate in the other heat pipes.

As the medium is condensed in the condensing chambers 16, the wick 44 draws the liquid medium from the condenser chambers into the evaporator chambers 18 and 20. The return of the medium to the evaporator 10 enables the medium to "heat up" and repeat the process of vaporization, return to the condenser, be condensed, and continue to cycle, powering the Stirling engine.

In the modified form of the evaporator 10 shown in FIG. 5, and indicated generally at 10a, like numerals with the suffix "a" are used to indicate like parts in the evaporator 10. In the evaporator 10a, the inner and outer walls 80 and 82, respectively, of the evaporator body 21a are continuous so the air gap 22 is eliminated. The walls 80 and 82 are of parabolic disc shape having different curvatures so that only a single peripheral weld 84 and an internal diametrically extending wall 86 are required to form the side-by-side chambers 18a and 20a.

Wicking 88 is engaged with the inner side of the front wall 80, wicking 90 is engaged with the inner side of the back wall 82 and wicking 92 is engaged with opposite sides of the divider wall 86. As one chamber 18a or 20a becomes hotter than the other, the medium in the wick 92 in the hotter chamber will become heated. This heated wick 92 will give up heat to the wall 86 which will in turn heat the medium in the wick 92 in the cooler chamber resulting in raising the temperature in the cooler chamber until it is equal to the temperature in the hotter chamber.

It can thus be seen that the improved solar evaporator 10 of this invention enables efficient and continued use of solar power to drive the engine 12 so long as heat from the sun is available.

What is claimed is:

1. A solar evaporator for a thermal engine, said evaporator comprising a hollow body member having a dish shape wall which receives solar rays for powering the engine, wall means dividing the interior of said body into at least a pair of side by side chambers,
   wick means adapted to transport vaporizable fluid, some of said wick means being disposed within said chambers and in heat exchange relation with said dish shape wall for transporting fluid therein; and
   other of said wick means in heat exchange relation with said side by side chambers for transferring heat between said chambers so as to maintain the temperatures therein substantially equal when the solar heat received directly by said chambers is unequal.

2. The solar evaporator according to claim 1 wherein said other wick means is positioned on said wall means in heat transfer engagement therewith and with said side-by-side chambers.

3. The solar evaporator according to claim 1 further including an auxiliary body attached to said body member and extending between said side by side chambers, said other wick means being disposed in said auxiliary body.

4. The solar evaporator according to claim 1 wherein said wick means transports fluid by capillary action.

5. A solar evaporator for a thermal engine comprising:
   a dish shape hollow body having first and second halves separated by an air space,
   said halves combining to form a concave front wall having an outer solar heat receiving face and a rear wall,
   wick means capable of transporting fluid by capillary action, said wick means being disposed within said body in engagement with at least some of the walls thereof, and
   an auxiliary body member engaged with an extending between said first and second halves, and wick means in said body in heat exchange relation with the halves to thereby maintain the temperatures therein substantially equal when the solar heat received by said halves is unequal.

6. A solar evaporator for a thermal engine comprising:
 a dish shape hollow body having first and second halves, common wall means between said body halves, said halves combining to form a concave front wall having an outer solar heat receiving face and a rear wall,
 wick means capable of transporting fluid by capillary action said wick means being disposed within said body in engagement with at least some of the walls thereof and with opposite sides of said common dividing wall for transferring heat between said halves to thereby maintain the temperatures therein substantially equal when the solar heat received by said halves is unequal.

* * * * *